L. D. REED.
VEHICLE CUSHIONING AND SHOCK ABSORBING DEVICE.
APPLICATION FILED FEB. 7, 1921.
1,402,890. Patented Jan. 10, 1922.
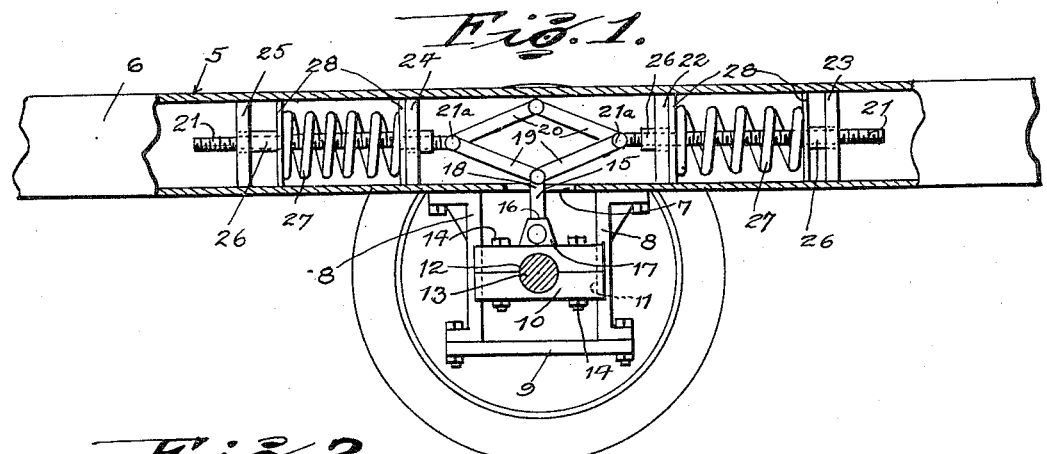
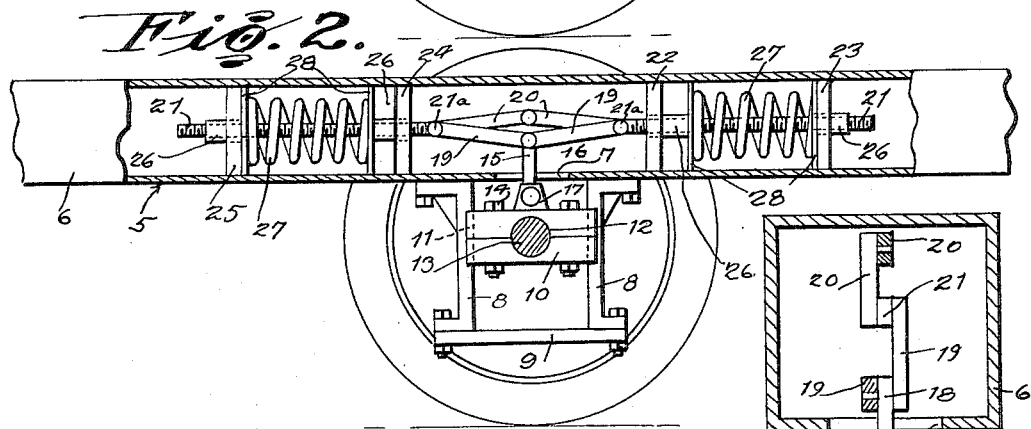
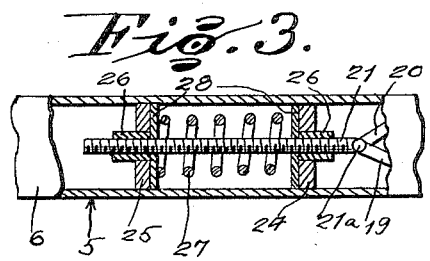
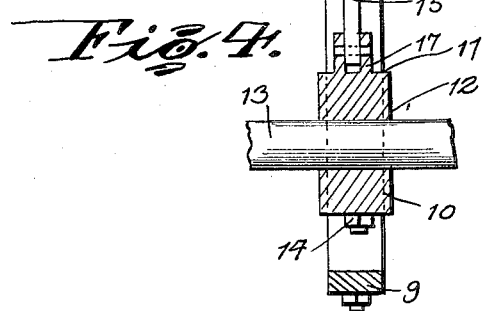
Luke D. Reed,
INVENTOR.
BY
Watson E. Coleman ATTORNEY.

UNITED STATES PATENT OFFICE.

LUKE D. REED, OF BURNHAM, ILLINOIS.

VEHICLE CUSHIONING AND SHOCK-ABSORBING DEVICE.

1,402,890.  Specification of Letters Patent.  Patented Jan. 10, 1922.

Application filed February 7, 1921. Serial No. 443,100.

*To all whom it may concern:*

Be it known that LUKE D. REED, a citizen of the United States, residing at Burnham, in the county of Cook and State of Illinois, has invented certain new and useful Improvements in Vehicle Cushioning and Shock-Absorbing Devices, of which the following is a specification, reference being had to the accompanying drawings.

This invention relates to vehicle cushioning and shock absorber devices and particularly to a device of this character which permits movement of the axle independently of the chassis or vehicle frame.

An object of the invention is to provide a device of this character wherein the axle is supported for movement relative to the vehicle frame and is operatively connected to the frame by means which also serve to cushion the vehicle frame and absorb shocks.

Another object is to provide a device of this character wherein the axle is supported for movement toward and away from the frame of the vehicle and connected to the vehicle by means which also yieldably supports the axle.

Another object is to provide a device of this character arranged to properly support and cushion the vehicle under normal conditions and to also serve as shock absorbing means under abnormal conditions.

A still further object of the invention is to provide a device of this character including a novel lever mechanism for operatively connecting the axle to the vehicle, said lever mechanism being adjustable to raise or lower the vehicle frame relative to the axle and the ground or to decrease or increase the power of the springs.

A still further object of the invention is to provide a device of this character including an axle supported for movement relative to the vehicle and means disposed within the frame of the vehicle for movement in a horizontal plane to control vertical movement of the axle relative to the frame.

With the above and other objects the invention consists in the improved construction and arrangement of parts to be hereinafter more particularly described, fully claimed and illustrated in the accompanying drawings, in which:—

Figure 1 is a side elevation partly in section showing the device in one position, Figure 2 is a side elevation partly in section showing the device in another position, Figure 3 is a longitudinal sectional view of the frame and the bearing block, showing the position of the sleeve nuts, Figure 4 is a transverse sectional view through the frame and the bearing block.

Referring to the drawings, 5 designates a vehicle frame or chassis including hollow side members 6, the lower surface of each member being provided with an opening 7. As the mechanism for supporting each end of the axle is the same, the description of one will suffice for both. Depending from the member 6 adjacent the opening 7 is a pair of spaced guide members or runners 8 which are connected at their lower ends by a connecting rod 9. Disposed between the guide members 8 is a split bearing block 10, said block being slightly longer than the distance between the guide members and being provided with a groove 11 in each end thereof adapted to receive one of the guide members so that a portion of the block engages the sides of the guide members to prevent disengagement of the bearing block. The bearing block is provided with a bearing 12 adapted to receive the axle 13, the sections of the block being connected to the axle by means of the bolts 14.

In order to properly support the axle to permit relative movement of the axle and the vehicle frame and at the same time cushion the axle in said movement, there is provided a novel equilizing and cushioning mechanism comprising a lever 15 which is connected at its end 16 to a lug 17 projecting from the upper surface of the upper section of the bearing block 10. The end 18 of the lever 15 is pivotally connected to a pair of levers 19 which in turn are pivotally connected at their ends to a pair of pivotally connected levers 20. The levers 19 and 20, form a lazy-tong mechanism which serves to equalize the pressure of the cushioning means, as the pressure of said means is delivered from two opposed sources. A rod 21 is pivotally connected at its end 21ª to the pivotally connected ends of the levers 19 and 20, each of said rods extending in opposite directions. Disposed within the side members 6, in spaced relation to the guide members 8 is a bearing block 22 while disposed in spaced parallel relation to the bearing block 22 is a bearing block 23. A bearing block 24 is disposed in spaced relation to the block 23 on the opposite side of the axle, while a bearing block 25 is disposed in spaced relation to the bearing block 24. It will be noted that these bearing blocks are disposed substantially in alignment, two bearing blocks being positioned on each side of the axle. Each of the blocks is provided with an opening adapted to receive a sleeve nut 26, the exterior of the sleeve being smooth while the interior is threaded. One pair of the sleeve nuts 26 is adapted to receive one of the bars 21 which is exteriorly threaded, the bars 21 being movable with the sleeves through the bearing blocks.

Disposed between the bearing blocks 22 and 23 and the bearing blocks 24 and 25 is a spring 27, each end of the spring being connected to a plate 28 provided with an opening for the reception of the rod 21. In this way the rod 21 is slidable through the plates 28 and the spring 27. It is of course obvious that the openings in the plates 28 are smaller than the openings in the bearing blocks so as to prevent the passage of the sleeve nuts therethrough. In view of this, movement of the rods 21 will cause the sleeve nuts to engage the plates 28 according to the direction of movement of the rods so as to permit the spring to be compressed from either end.

In the operation of the device, the bearing block 10 is adapted to slide vertically between the guides 8 relative to the frame 5 so that any movement of the block will cause the axle to be cushioned by the spring 27. In the movement of the block between the axle, for instance movement of the axle toward the frame, the levers 19 and 20 are swung toward each other, thereby forcing the rods 21 together with the sleeve nuts outwardly through the bearing blocks and causing the ends of the innermost sleeve nuts to engage the innermost plates of the springs, thereby compressing the spring and properly cushioning the axle. Upon movement of the axle in the opposite direction, that is away from the frame and toward the ground, the levers 19 and 20 are moved away from each other, thereby causing the outermost sleeve nuts to engage the outermost plate 28 and compress the opposite ends of the spring so that the same cushioning operation is possible regardless of the direction in which the axle is moving. At the same time the resilient power of two springs is used, and this power is delivered from the side of the axle and is equally distributed through the medium of the lazy-tong mechanism comprising the levers 19, 20 and 15 so that the cushioning force of the springs is delivered directly to the top of the bearing block.

This novel feature, not only permits the device to perform the usual functions of the old form of spring, but to also serve as shock absorbers when the vehicle is traveling over bad roads or under abnormal conditions, such as the pressure of a heavy load. Another important feature, is that the sleeve nut 26 may be adjusted longitudinally of the rods 21 so as to increase or decrease the power of the springs 27 according to the load. This also permits the chains to be raised or lowered, relative to the ground.

From the foregoing it will be readily seen that this invention provides a novel form of vehicle cushioning and shock absorbing mechanism which is compact in form, does not project above the top of the frame, and is protected at all times as the main portion of the operating parts are disposed within the frame. In addition to this it prevents wear of the various parts of the vehicle in view of the fact that the axle is movable independently of the frame so that the rigidity of the axle and frame which is present with the use of the conventional form of vehicle spring, is eliminated with this novel mechanism.

What is claimed is:—

1. A vehicle cushioning and shock absorbing mechanism comprising a vehicle frame, spaced guides carried by each side of the frame, a bearing block slidable between the guides and adapted to receive the ends of an axle, springs mounted adjacent each end of the axle, a rod disposed within each spring, adjustable means carried by the ends of the rods for compressing said spring according to the relative movement of the axle and vehicle frame, and a lazy tong mechanism connecting the confronting ends of the rods and the axle to each other for compressing the spring according to relative movement of the axle and the vehicle frame.

2. A vehicle cushioning and shock absorbing mechanism embodying a vehicle frame, said frame being hollow, supporting means carried by the frame, an axle slidable in said supporting means, opposed bearing members disposed within each of the side members of the frame, opposed rods slidable in said bearings on each side of the axle and in spaced relation to the axle, springs surrounding said rods between the bearings of each of the rods, said springs being adapted to urge the rods in one direction, a pair of links pivoted to the confronting ends of each of the rods, one link of one pair being connected to one link of the opposite pair, the remaining link of each pair being operatively connected to said axle.

In testimony whereof I hereunto affix my signature.

LUKE D. REED.